(12) United States Patent
Grosser et al.

(10) Patent No.: US 8,331,373 B2
(45) Date of Patent: Dec. 11, 2012

(54) METHODS, SYSTEMS, AND COMPUTER READABLE MEDIA FOR AUTOMATICALLY SELECTING BETWEEN INTERNET PROTOCOL SWITCHING MODES ON A PER-MODULE BASIS IN A PACKET FORWARDING DEVICE

(75) Inventors: Donald B. Grosser, Apex, NC (US); Edward J. Rovner, Chapel Hill, NC (US); Olen L. Stokes, Cary, NC (US)

(73) Assignee: Extreme Networks, Inc., Santa Clara, CA (US)

( * ) Notice: Subject to any disclaimer, the term of this patent is extended or adjusted under 35 U.S.C. 154(b) by 241 days.

(21) Appl. No.: 12/820,111

(22) Filed: Jun. 21, 2010

(65) Prior Publication Data

US 2011/0222539 A1   Sep. 15, 2011

Related U.S. Application Data

(60) Provisional application No. 61/340,279, filed on Mar. 15, 2010.

(51) Int. Cl.
*H04L 12/28* (2006.01)

(52) U.S. Cl. ............... 370/392; 370/389; 370/395.1; 709/238; 709/239

(58) Field of Classification Search ............ 370/389, 370/395.31, 474; 709/238, 239
See application file for complete search history.

(56) References Cited

U.S. PATENT DOCUMENTS

| | | | |
|---|---|---|---|
| 4,277,844 A | 7/1981 | Hancock et al. |
| 4,335,548 A | 6/1982 | Rehbein |
| 4,464,747 A | 8/1984 | Groudan et al. |
| 4,617,664 A | 10/1986 | Aichelmann et al. |
| 4,775,978 A | 10/1988 | Hartness |
| 4,958,350 A | 9/1990 | Worley et al. |
| 5,056,095 A | 10/1991 | Horijuchi et al. |
| 5,058,115 A | 10/1991 | Blake et al. |
| 5,251,219 A | 10/1993 | Babb |

(Continued)

FOREIGN PATENT DOCUMENTS

KR   10-2009-0022484   3/2009

OTHER PUBLICATIONS

Official Action for U.S. Appl. No. 12/060,111 (Mar. 29, 2010).

(Continued)

*Primary Examiner* — Robert Wilson
*Assistant Examiner* — Mohamed Kamara
(74) *Attorney, Agent, or Firm* — Jenkins, Wilson, Taylor & Hunt, P.A.

(57) ABSTRACT

The subject mailer described herein includes methods, systems, and computer readable media for automatically selecting between Internet protocol switching modes on a per-module basis in a packet forwarding device. According to one aspect, a method may include determining capacities of hardware longest prefix matching (LPM) tables located on each input/output (I/O) module in a multi-module IP packet forward device. The number of routes currently stored in a software LPM table may be determined. If the software LPM table can be stored within the hardware LPM table for an I/O module, an LPM mode may be automatically selected for that I/O module. If the contents of software LPM table cannot be stored within the hardware LPM table for a particular I/O module, the I/O module may be automatically transitioned to operate in an Internet protocol forwarding database (IPFDB) mode.

29 Claims, 6 Drawing Sheets

U.S. PATENT DOCUMENTS

| | | | |
|---|---|---|---|
| 5,257,391 | A | 10/1993 | DuLac et al. |
| 5,453,998 | A | 9/1995 | Dang |
| 5,463,644 | A | 10/1995 | Rodi et al. |
| 5,680,579 | A | 10/1997 | Young et al. |
| 6,034,957 | A | 3/2000 | Haddock et al. |
| 6,295,299 | B1 | 9/2001 | Haddock et al. |
| 6,470,425 | B1 | 10/2002 | Yamashiroya |
| 6,792,423 | B1 | 9/2004 | Jeffries et al. |
| 6,947,931 | B1 | 9/2005 | Bass et al. |
| 7,028,213 | B2 | 4/2006 | Majni et al. |
| 7,174,441 | B2 | 2/2007 | Singh et al. |
| 7,386,663 | B2 | 6/2008 | Cousins |
| 7,613,209 | B1 * | 11/2009 | Nguyen et al. ................ 370/474 |
| 7,724,734 | B1 | 5/2010 | Grosser et al. |
| 7,843,927 | B1 * | 11/2010 | Grosser et al. ................ 370/392 |
| 7,983,270 | B2 * | 7/2011 | Wong ...................... 370/395.31 |
| 8,089,963 | B2 * | 1/2012 | Melman et al. ............... 370/389 |
| 2002/0078196 | A1 | 6/2002 | Kim et al. |
| 2003/0061558 | A1 | 3/2003 | Fackenthal et al. |
| 2003/0163660 | A1 | 8/2003 | Lam |
| 2004/0052251 | A1 | 3/2004 | Mehrotra et al. |
| 2004/0170156 | A1 | 9/2004 | O'Neill |
| 2005/0025072 | A1 | 2/2005 | Okada et al. |
| 2005/0076010 | A1 | 4/2005 | Bass et al. |
| 2005/0201302 | A1 | 9/2005 | Gaddis et al. |
| 2005/0232204 | A1 | 10/2005 | Bass |
| 2006/0002386 | A1 | 1/2006 | Yik et al. |
| 2006/0187930 | A1 | 8/2006 | Smith et al. |

OTHER PUBLICATIONS

Official Action for U.S. Appl. No. 10/934,928 (Feb. 19, 2010).
Notice of Allowance and Fee(s) Due for U.S. Appl. No. 11/317,665 (Jan. 11, 2010).
Official Action for U.S. Appl. No. 11/644,701 (Nov. 25, 2009).
Interview Summary for U.S. Appl. No. 11/644,701 (Sep. 22, 2009).
Official Action for U.S. Appl. No. 10/934,928 (Jun. 10, 2009).
Final Official Action for U.S. Appl. No. 11/317,665 (May 11, 2009).
Interview Summary for U.S. Appl. No. 11/644,701 (Apr. 22, 2009).
Official Action for U.S. Appl. No. 11/644,701 (Mar. 25, 2009).
Final Official Action for U.S. Appl. No. 10/934,928 (Dec. 2, 2008).
Official Action for U.S. Appl. No. 11/317,665 (Oct. 1, 2008).
Commonly-assigned, co-pending U.S. Appl. No. 12/060,111 for "Method and Systems for Automatic Expansion and Contraction of IP Host Forwarding Database," (Unpublished, filed Mar. 31, 2008).
Official Action for U.S. Appl. No. 10/934,928 (Feb. 22, 2008).
Notification of Transmittal of the International Search Report and the Written Opinion of the International Searching Authority, or the Declaration for PCT/US2005/031939 (Jan. 11, 2006).
Commonly-assigned, co-pending U.S. Appl. No. 10/934,928 for "Memory Array Error Correction," (Unpublished, filed Sep. 3, 2004).
Netlogic Microsystems, Product Brief NSE5000GLQ, available at: http://www.netlogicmicro.com/datasheets/nse5000glq.html, (Copyright 2004).
Van Ess, "A Circular FIFO, PSoC Style," Cypress Microsystems, Application Note AN2036, Rev. B, pp. 1-5 (Jun. 21, 2002).
Liu, "Routing Prefix Caching in Network Processor Design," IEEE proceedings, Computer Communications Networks, p. 18-23 (Oct. 15-17, 2001).
Zhang, "Recovery of Memory and Process in DSM Systems: HA Issue #1," Hewlett-Packard Co. HPL-2001-76 (Mar. 30, 2001).
Alzahrani et al., "On-Chip TEC-QED ECC for Ultra-Large, Single-Chip Memory Systems," Computer Design: VLSI in Computers and Processors, 1994. ICCD '94 Proceedings, IEEE International Conference on Cambridge, MA, Oct. 12, 1994, Los Alamitos, CA, IEEE Computer Society, pp. 132-137 (Oct. 10, 1994).
Rijsinghani, "Computation of the Internet Checksum via Incremental Update," Network Working Group, RFC 1624 (May 1994).
Mallory et al., "Incremental Updating of the Internet Checksum," Network Working Group, RFC 1141 (Jan. 1990).
Braden et al., "Computing the Internet Checksum," Network Working Group, RFC 1071 (Sep. 1988).
Patterson et al., A Case for redundant Arrays of Inexpensive Disks (RAID), ACM (1988).
Notification of Transmittal of the International Search Report and the Written Opinion of the International Searching Authority, or the Declaration for International Application No. PCT/US2011/028526 (Nov. 23, 2011).
Supplemental Notice of Allowability for U.S. Appl. No. 11/644,701 (Aug. 3, 2010).
Notice of Allowance and Fee(s) Due for U.S. Appl. No. 11/644,701 (Jul. 26, 2010).

* cited by examiner

METHODS, SYSTEMS, AND COMPUTER READABLE MEDIA FOR AUTOMATICALLY SELECTING BETWEEN INTERNET PROTOCOL SWITCHING MODES ON A PER-MODULE BASIS IN A PACKET FORWARDING DEVICE

PRIORITY CLAIM

This application claims the benefit of U.S. Provisional Patent Application Ser. No. 61/340,279 filed Mar. 15, 2010; the disclosure of which is incorporated herein by reference in its entirety.

TECHNICAL FIELD

The subject matter described herein relates to routing Internet protocol (IP) packets. More particularly, the subject matter described herein relates to methods, systems, and computer readable media for automatically selecting between IP switching modes on a per-module basis in a packet forwarding device.

BACKGROUND

Conventional IP networking equipment hardware utilizes one of two general approaches for routing IP packets. In the first approach (hereinafter, "LPM mode" or "the LPM approach"), the IP destination address of each packet is used as a key to search a hardware-based longest prefix match (LPM) table containing variable length address prefixes. A match in the hardware LPM table results in an index into an IP adjacency table where nexthop forwarding information needed to successfully route the packet is obtained. In the first approach, the hardware LPM table can be populated using one or more routing protocols which exchange information with neighboring IP packet forwarding devices or populated via configuration.

In the second approach (hereinafter, "IPFDB mode" or "the IPFDB approach"), the IP destination address of each packet is used as a key to search a hardware-based IP host forwarding database (IPFDB) populated with the IP addresses of active hosts. It is appreciated that active hosts may include both directly attached hosts and hosts remotely located on the other side of the network when operating in IPFDB mode. A match in the hardware IPFDB results in the nexthop forwarding information needed to successfully route the packet. In the second approach, the IP addresses of active hosts are populated in the IPFDB on an "on demand" basis. That is, when a stream for a given host starts up, its IP address is initially not stored in the IPFDB and must be slowpath processed, where slowpath processing includes processing the packet using a central processing unit (CPU). Successful slowpath processing of the packet results in the IP addresses of active hosts being programmed into the hardware IPFDB for subsequent packets.

Figure 1:
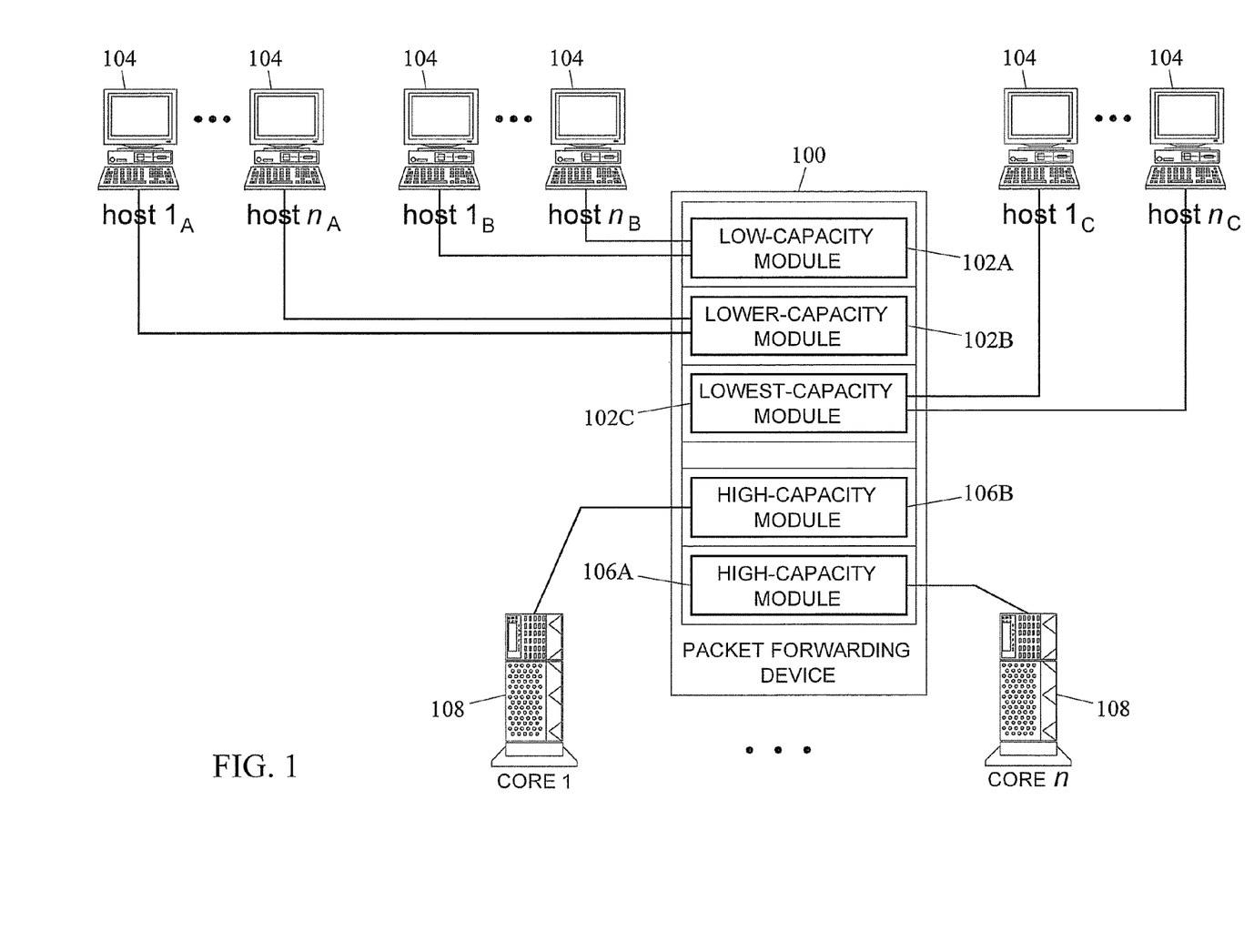
FIG. 1 is a network diagram illustrating a multi-mode layer 3 packet forwarding device including edge modules connected to multiple end terminal devices and aggregator modules connected to one or more core network devices according to an embodiment of the subject matter described herein.

For example, referring to FIG. 1, I/O modules 102A and 106A may operate in either LPM mode or IPFDB mode. In LPM mode, LPM tables 200 and 204 may be populated with entries corresponding to variable length address prefixes and next hops for reaching destinations and IPFDBs 202 and 206 may be populated with full-length 32- or 128-bit host entries. In IPFDB mode, LPM tables 200 and 204 and IPFDBs 202 and 206 may be populated with full-length 32- or 128-bit host entries. Additionally, I/O modules 102A-102C and 106A-106B may be operated in a "hybrid" mode where, for each I/O module, the IPFDB may be populated with full address entries for directly connected hosts and the LPM table may be populated with a mixture of variable length prefixes and full host addresses. Additional details regarding this aspect are described in U.S. patent application Ser. No. 11/317,665, filed on Dec. 23, 2005, and U.S. patent application Ser. No. 11/644,701, filed on Dec. 22, 2006, the disclosures of which are incorporated by reference herein in their entireties.

One advantage of the LPM approach is that an almost limitless number of host end-stations can communicate through the switch without slowpath intervention when the entire routing table can be contained in the available hardware LPM table. In contrast, one advantage of the IPFDB approach is that routing may be faster when the route table doesn't fit in the hardware LPM table (e.g. for small numbers of hosts). For example, by routing packets based on exact match lookups in a hardware-based IPFDB located on each I/O module, less memory and CPU resources may be used to slowpath process packets. In other words, the LPM approach is more advantageous when the entire routing table can be contained in the available hardware LPM table, while the IPFDB approach is more advantageous when the entire routing table cannot be contained in the available hardware LPM table.

When producing cost-sensitive networking equipment, the hardware LPM table size can be limited for some applications. In one exemplary scenario, an edge module may support 512 LPM IPv4 routes and 2K IPv4 hosts and an aggregation module may support 512,000 LPM IPv4 routes and 16,000 IPv4 hosts. Next, consider a network with a control plane routing table size of 250,000 IPv4 routes and 1,000 directly attached IPv4 hosts. It may be appreciated that this entire routing table cannot be contained in the available hardware LPM table of edge modules 102A-102C yet can be entirely contained in the LPM table of aggregator modules 106A-106B. As such, IPFDB-mode routing may be desirable for edge modules 102A-102C in order to avoid unnecessary slowpath processing. Because edge module cannot store 250,000 routes in an LPM table size of 512, it would serve little purpose to populate just 512 out of 250,000 routes (i.e., 0.2%) into this HW table. Thus, the IPFDB approach requires less memory and less CPU power in the packet forwarding equipment by only maintaining a cache of active hosts, not the entire routing table.

In contrast, LPM-mode routing may be desirable for aggregator modules 106A-106B because the routing table is within the hardware limits because all directly connected hosts may be routed to using hardware IPFDBs and all hosts connected via a gateway may be routed to using hardware LPM tables, without the need for slowpath processing packets.

One problem associated with conventional packet forwarding devices is that they may use inefficient approaches for some I/O modules under certain conditions. For example, in packet forwarding device 100, if I/O modules 102A and 106A are operated in LPM mode (the default), then low-capacity I/O module 102A may store a virtually meaningless fraction of the number of routes, adding no performance benefit to packet forwarding device 100.

Another problem is that some packet forwarding equipment may not have enough memory to hold the entire routing table in software, nor enough CPU power to handle all the route add and delete operations. For example, conventional LPM mode operation requires more memory and CPU power to handle route add and delete operations, while IPFDB mode does not because, instead, IPFDB mode only maintains a cache of active hosts, not the entire routing table. As mentioned above, in scenarios in which IPFDB mode is desirable, but not used, the conventional packet forwarding devices may operate sub-optimally.

Accordingly, there exists a need for improved methods, systems, and computer readable media for more efficiently utilizing the hardware-based LPM table and IPFDB in IP packet forwarding devices.

SUMMARY

The subject matter described herein includes methods, systems, and computer readable media for automatically selecting between Internet protocol switching modes on a per-module basis in a packet forwarding device. According to one aspect, the subject matter described herein includes a packet forwarding device including at least one input/output (I/O) module. The at least one I/O module includes a longest prefix matching (LPM) table, an Internet protocol forwarding database (IPFDB) and the packet forwarding device includes an IP routing table and an IPFDB. When the I/O module operates in an LPM mode, the IPFDB on the I/O module is populated with entries corresponding to active hosts, the LPM table on the I/O module is populated from the IP routing table with routes learned from IP routing protocols, and layer 3 packets received by the I/O module are routed using the IPFDB and LPM table of the I/O module. An automatic mode-selection module determines a capacity of the LPM table on the I/O module. The automatic mode-selection module also determines a total number of IP routes stored in the IP routing table and determines a relationship between the total number of IP routes and the capacity of the LPM table. In response to determining that the total number of IP routes has a predetermined relationship with the capacity of the LPM table, the automatic mode-selection module also automatically switches the I/O module from the LPM mode to an IPFDB mode, where the IPFDB and the LPM table are populated with entries corresponding to active hosts and layer 3 packets received by the I/O module are routed using the IPFDB and LPM table of the I/O module.

According to another aspect, a method for automatically selecting a forwarding approach on a per-module basis is disclosed. The method includes operating an input/output (I/O) module in a multi-I/O-module packet forwarding device in an LPM mode. The I/O module includes a longest prefix matching (LPM) table and an Internet protocol forwarding database (IPFDB) and the packet forwarding device includes an IP routing table. Operating the I/O module in an LPM mode includes populating the IPFDB with entries corresponding to active hosts, populating the LPM table with entries from the IP routing table with routes learned from IP routing protocols, and routing layer 3 packets received by the I/O module using the IPFDB and LPM table of the I/O module. A capacity of the LPM table is determined. A total number of IP routes stored in the IP routing table and a relationship between the total number of IP routes in the IP routing table and the capacity of the LPM table is determined. In response to determining that the total number of IP routes in the IP routing table has a predetermined relationship with the capacity of the LPM table, the I/O module is automatically switched from the LPM mode to an IPFDB mode, where operating the I/O module in IPFDB mode includes populating the IPFDB and the LPM table with entries corresponding to active hosts and routing layer 3 packets received by the I/O module using the IPFDB and LPM table of the I/O module.

The subject matter described herein for automatically selecting between Internet protocol switching modes on a per-module basis in a packet forwarding device may be implemented in hardware, software, firmware, or any combination thereof. The subject matter described herein may be implemented using computer executable instructions embodied in a tangible, non-transitory computer readable medium. Exemplary non-transitory computer readable media suitable for implementing the subject matter described herein include disk memory devices, chip memory devices, programmable logic devices, and application-specific integrated circuits. In addition, a computer program product that implements the subject matter described herein may be implemented on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

As mentioned above, because conventional networking devices may include a mixture of I/O modules having different hardware-based LPM table sizes, it may be desirable to operate some I/O modules in LPM mode and other modules in IPFDB mode. According to the subject matter described herein, a method for automatically selecting between IP switching modes on a per-module basis is disclosed. The method may include determining the capacities of the hardware LPM tables located on each I/O module in a multi-module IP packet forward device (e.g., a router). Next, the number of routes currently stored in the software LPM table (shared by all I/O modules) is determined. If the software LPM table can be stored entirely within the hardware LPM table for an I/O module, then LPM mode may be automatically selected for that I/O module. Conversely, if the contents of software LPM table cannot be stored within the hardware LPM table for a particular I/O module, then that I/O module may be automatically transitioned to operate in IPFDB mode, which may be a more efficient use of hardware resources. Thus, a multi-module packet forwarding device including I/O modules having different hardware LPM table sizes can automatically be operated optimally based on network conditions. An exemplary system including a multi-module IP packet forwarding device as will now be described below with respect to FIG. 1.

FIG. 1 is a network diagram illustrating a multi-module IP packet forwarding device for automatically selecting between IP switching modes on a per-module basis according to an embodiment of the subject matter described herein. Referring to FIG. 1, packet forwarding device 100 may include one or more I/O modules 102A-102C and 106A-106B. For example, packet forwarding device 100 may include edge modules 102A-102C connected to end terminals 104 representing directly communicating hosts. For example, I/O module 102B may be connected to an arbitrary number of hosts 104 labeled host $1_A$-host $n_A$. Similarly, I/O module 102B may be connected to hosts 104 labeled host $1_B$-host $n_B$ and I/O module 102C may be connected to hosts 104 labeled host $1_C$-host $n_C$.

Aggregator modules 106A and 106B may be connected to core network devices 108 (i.e., arbitrary number of cores labeled core 1 through core n) for handling larger volumes of network traffic. Because core network devices 108 are typically associated with a large number of routes and fewer directly connected hosts, aggregator modules 106A and 106B may be optimized for performing longest prefix match searches given the routing table size and the likely number of IP hosts (both direct and remote).

Because of this, it may be appreciated that edge modules 102A-102C may also be referred to as low-capacity I/O modules because they may have smaller IPFDB and LPM table sizes and, therefore, support fewer hosts and routes than high-capacity aggregator modules 106A-106B. Additionally, within the category of low-capacity I/O modules (e.g., edge modules 102A-102C), the relative sizes of the hardware IPFDB and LPM tables may vary. To illustrate this, I/O module 102A may hereinafter be referred to as a "low-capacity" I/O module (e.g., supporting 512 routes and 2,000 hosts), I/O module 102B may be referred to as a "lower-capacity" I/O module (e.g., supporting 256 routes and 1,500 hosts), and I/O module 102C may be referred to as a "lowest-capacity" I/O module (e.g., supporting 128 routes and 1,000 hosts).

In contrast to low-capacity edge modules 102A-102C, aggregator modules 106A-106B may have significantly larger hardware IPFDB and LPM table sizes and, therefore, may support a significantly larger number of hosts and routes. Aggregator modules 106A and 106B may connect to one or more core network devices 108 labeled core 1 through core n and, therefore, may handle a much larger traffic volume than edge modules 102A-102C. Aggregator modules 106A and 106B may also each include hardware-based IPFDB and LPM tables. Aggregator modules 106A-106B may also be referred to as high-capacity modules because they may each support, for example, approximately 16,000 hosts and 250,000 routes.

As mentioned above, when the number of routes is small, all I/O modules 102A-102C and 106A-106B may benefit from the LPM forwarding approach. However, as the number of routes increases and crosses a predetermined threshold, only high-capacity I/O modules may benefit from the LPM forwarding approach. Therefore, the subject matter described herein provides for automatically transitioning low-capacity I/O modules to IPFDB forwarding once the number of routes exceeds the threshold. As a result, traffic arriving on a given I/O module may automatically utilize the best forwarding approach (i.e., either LPM or IPFDB) for that module. A packet forwarding device including multiple I/O modules operating in a mixture of LPM and IPFDB forwarding modes may, therefore, be referred to as a hybrid- or multi-mode packet forwarding device.

One advantage to the automatic approach described herein is that it allows for more HW forwarding in low-capacity I/O modules by using the hardware LPM table as a cache for active individual hosts. Rather than storing a meaningless fraction of the entire routing table in the LPM table, low-capacity I/O modules may instead store active hosts in both the LPM table and the IPFDB, thereby providing faster HW forwarding for as many hosts as possible.

Another advantage to the automatic approach described herein is that it avoids forcing the user to correctly pre-configure the appropriate mode for each I/O module. It may be difficult to accurately predict the number of IP routes for a given I/O module and, further, the number of IP routes may change over time. The result is that either some I/O modules are inefficiently configured or the time required to correctly configure each I/O module is burdensome to users. By allowing the packet forwarding device to automatically select the optimum packet forwarding approach on a per-module basis, all I/O modules operate efficiently without burdening the user.

Figures 2A, 2B:
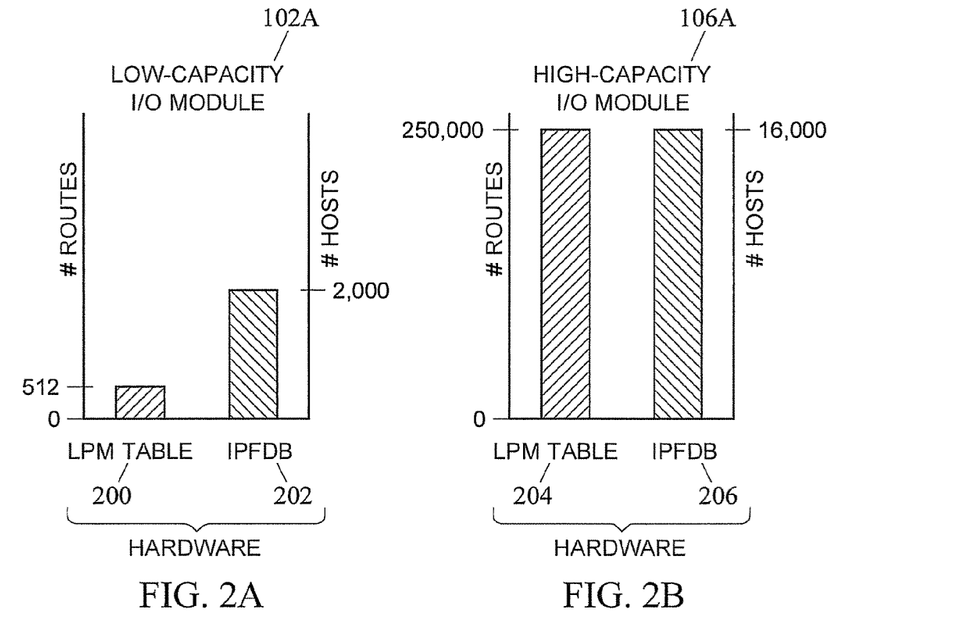
FIG. 2 is a chart illustrating an exemplary relationship between a total number of IP routes and a capacity of a hardware-based LPM table of an I/O module for selecting between an LPM forwarding mode and an IPFDB forwarding mode according to an embodiment of the subject matter described herein.
Figure 2C:
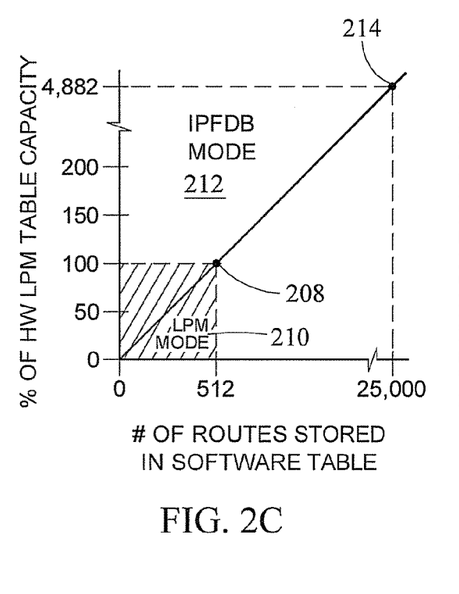
Figure 2D:
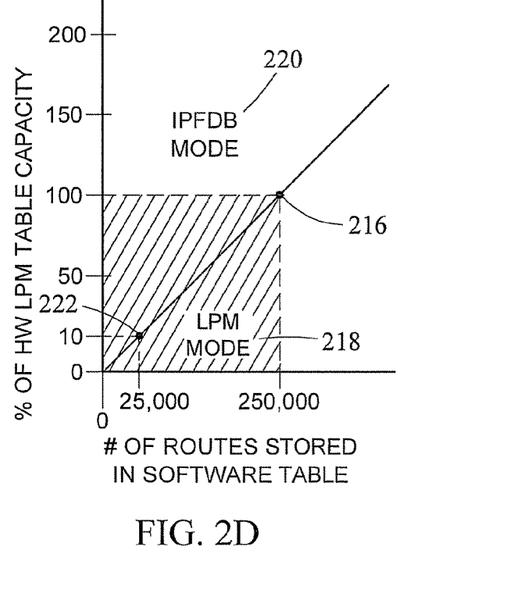

FIGS. 2A-2D are charts illustrating exemplary relationships between the total number of IP routes and the capacity of a hardware-based LPM table for selecting between an LPM forwarding mode and an IPFDB forwarding mode according to an embodiment of the subject matter described herein. Specifically, FIGS. 2A and 2B illustrate the relative table sizes of a low-capacity I/O module and a high-capacity I/O module. FIGS. 2C and 2D illustrate exemplary thresholds for differentiating when LPM mode and IPFDB modes are optimal for the exemplary low- and high-capacity I/O modules shown in FIGS. 2A and 2B, respectively. As used herein, a low-capacity I/O module may refer to an I/O module having a relatively small HW LPM table size. In contrast, a high-capacity I/O module may refer to I/O module having a relatively large HW LPM table size. As mentioned above, edge modules are typically low-capacity I/O modules and aggregator modules are typically high-capacity I/O modules. However, it is appreciated that among low- and high-capacity I/O modules, further variations in hardware LPM table sizes may exist. For example, in cost-sensitive networking equipment, some low-capacity I/O modules may include hardware-based LPM tables that support a maximum of 256 routes, while other low-capacity I/O modules may include hardware-based LPM tables that support a maximum of 512 routes.

FIG. 2A illustrates exemplary sizes of a hardware-based LPM table and IPFDB for a low-capacity I/O module 102A. Referring to FIG. 2A, low-capacity I/O module 102A may include HW LPM table 200 and HW IPFDB 202. The capacity of LPM table 200 may be measured in terms of the number of routes that can be stored in the table, as indicated by the left-hand column of FIG. 2A. In contrast, the capacity of IPFDB 202 may be measured by the maximum number of host entries that can be stored, as indicated by the right-hand column. For example, LPM table 200 may store up to 512 routes and IPFDB 202 may store up to 2,000 hosts. It may be appreciated that various aspects of FIGS. 2A-2D may not be depicted to scale.

Similarly, FIG. 2B illustrates exemplary sizes of a hardware-based LPM table and IPFDB for high-capacity I/O module 106A. High-capacity I/O module 106A may support a relatively larger number of routes and/or hosts than low-capacity I/O module 102A. For example, HW LPM table 204 may support a maximum of 250,000 routes and HW IPFDB 206 may support a maximum of 16,000 hosts.

Next, consider a scenario in which the software routing table of packet forwarding device 100 presently stores 25,000 routes. Because 25,000 routes can be stored entirely within HW LPM table 204 on high-capacity I/O module 106A (i.e., 25,000<250,000), it may be desirable to operate (or continue to operate) high-capacity I/O module 106A in LPM mode. In contrast, because 25,000 routes cannot be stored within HW LPM table 200 on low-capacity I/O module 102A (i.e., 25,000>512), it may be desirable to operate low-capacity module 102A in IPFDB mode. Each of these scenarios will be described in greater detail below with respect to FIGS. 2C and 2D.

FIGS. 2C and 2D illustrate an exemplary relationship between the capacity of HW LPM tables 200 and 204 with the number of routes stored in software, respectively. Specifically, the chart shown in FIG. 2C corresponds to low-capacity I/O module 102A shown in FIG. 2A, while the chart shown in FIG. 2D corresponds to high-capacity I/O module 106A shown in FIG. 2B. Referring to FIG. 2C, it may be appreciated that as the number of routes stored in software increases, so does the percentage of HW LPM table 200 required to store the routes. For HW LPM table 200, 100% of table capacity is reached at 512 routes, as indicated by point 208. In one embodiment, operating low-capacity I/O module 102A in LPM mode may be optimal for a number of routes less than 512 and/or a capacity utilization percentage less than 100%. In other embodiments, optimal values for operating low-capacity I/O module 102A may be less than or greater than 512 routes/100% capacity utilization. One exemplary threshold point, below which LPM mode may be optimal for low-capacity I/O module 102A, may be indicated by shaded area 210. Conversely, for values larger than 512 routes/100% capacity utilization (or whichever threshold is chosen), IPFDB mode may be optimal, as indicated by un-shaded area 212.

Continuing the exemplary scenario described above in which the software routing table presently stores 25,000 routes, it may be appreciated that 25,000 routes is far outside of shaded area 210 indicating when LPM mode is optimal. As indicated by data point 214, 25,000 routes corresponds to approximately 4,882% of the capacity of HW LPM table 200. Or, expressed another way, HW LPM table 200 is capable of storing just 2% of the total number of routes stored in the software table (not shown).

Referring to FIG. 2D, it may be appreciated that, like FIG. 2C, as the number of routes stored in software increases, the percentage of HW LPM table 204 required to store the routes also increases. For HW LPM table 204, 100% of table capacity is reached at 250,000 routes, as indicated by point 216. Therefore, in contrast to low-capacity module 102A, the same utilization percentage threshold may be achieved at a significantly larger number of routes. For example, it may be optimal to operate high-capacity I/O module 106A in LPM mode if the number of routes in the software table (not shown) is less than 250,000 routes corresponding to a capacity utilization percentage less than 100%. Like FIG. 2C, the values for which LPM mode may be optimal for high-capacity I/O module 106A may be indicated by shaded area 218, while the values for which IPFDB mode may be optimal may be indicated by un-shaded area 220.

Returning to the exemplary scenario described above in which the software table stores 25,000 routes, in contrast to FIG. 2C, it may be appreciated that 25,000 routes is well within shaded area 218 indicating when LPM mode is optimal. As indicated by data point 222, 25,000 routes corresponds to approximately 10% of the capacity of HW LPM table 106A. Therefore, LPM mode may be automatically selected for high-capacity module 106A while IPFDB may be automatically selected for low-capacity module 102A.

Figure 3:
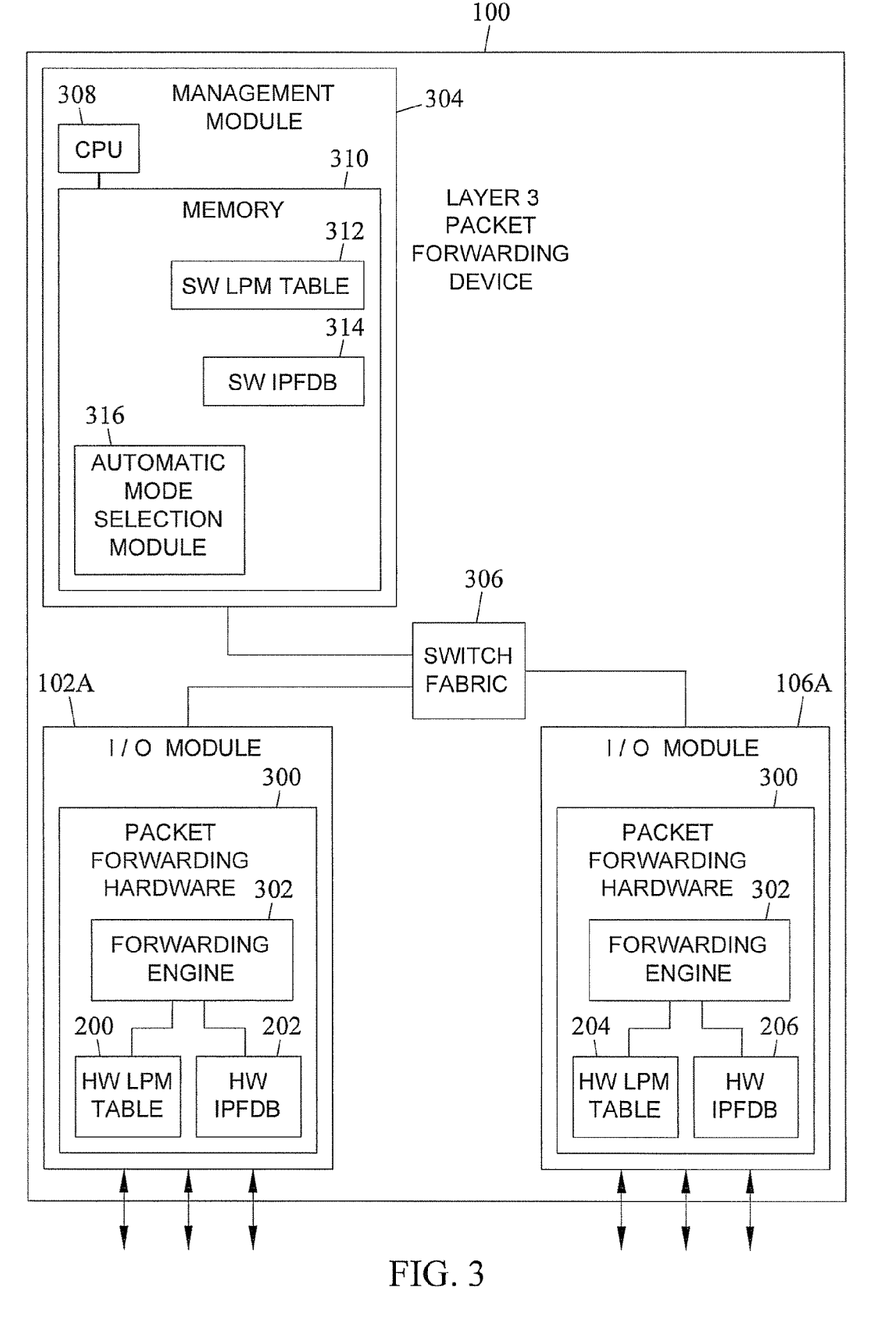
FIG. 3 is a block diagram of an exemplary multi-mode layer 3 packet forwarding device including I/O modules that may be operated in one of an LPM forwarding mode and an IPFDB forwarding mode according to an embodiment of the subject matter described herein.

FIG. 3 is a block diagram illustrating exemplary components of a multi-mode layer 3 packet forwarding device according to an embodiment of the subject matter described herein. Referring to FIG. 3, packet forwarding device 100 may include one or more I/O modules and a management module connected together via a switch fabric. For example, packet forwarding device 100 may include low-capacity I/O module 102A and high-capacity I/O module 106A. Module 102A may include packet forwarding hardware 300 for processing packets received by I/O module 102A. Packet forwarding hardware 300 may include forwarding engine 302, hardware LPM table 200 for storing entries from the IP routing table (i.e., software LPM table 312) learned from IP routing protocols (i.e., variable length prefixes and next hop addresses), and hardware IPFDB 202 for storing entries corresponding to local and/or remote hosts. It is appreciated that routes contained in the LPM table for each I/O module may be received from an IP routing table located on management module 304. Similarly, I/O module 106A may include packet forwarding hardware 300 including forwarding engine 302, hardware-implemented LPM table 204, and hardware-implemented IPFDB 206. It is appreciated that additional I/O modules (e.g., I/O modules 102B, 102C, and 106B) are not shown in FIG. 3 for simplicity but may be included in packet forwarding device 100 without departing from the scope of the subject matter described herein. It is further appreciated that hardware LPM tables and hardware IPFDBs may, or may not, be the same hardware structure. For example, some forwarding hardware structure could use a single table for both LPM and host entries. The single table could hold routes and /32 direct hosts or, if too many routes are present, the table could automatically switch to holding /32 local and remote hosts.

In one implementation, forwarding engine 302 may first perform a lookup in IPFDB 202/206 in order to determine where to forward a received packet. If the lookup in IPFDB 202/206 fails, a lookup may be performed in LPM table 200/204. If a lookup in LPM table 200/204 fails, the packet may be forwarded to management module 304 which performs lookups in software tables 312 and/or 314 to forward the packet.

In addition to I/O modules 102A and 106A, packet forwarding device 100 may include management module 304 and switch fabric 306. Switch fabric 306 switches packets between I/O modules 102A, 106A, and management module 304. Management module 304 may control the overall operation of I/O modules 102A and 106A. In addition, management module 304 may include a CPU 308 that controls its operation and a memory 310 that stores software-implemented LPM table 312 (i.e., IP routing table) and software-implemented IPFDB 314. In particular, software LPM table 312 may include entries learned through participation in IP routing protocols such as routing information protocol (RIP) and open shortest path first (OSPF) or via configuration. Management module 304 may also include an automatic mode selection module 316 for automatically selecting the IP switching mode (i.e., LPM mode or IPFDB mode) in which to operate each of I/O modules 102A and 106A.

In one embodiment, management module 304 may include an IPFDB update controller (not shown) that controls the updating of software IPFDB 314. In one embodiment, IPFDB update controller (not shown) may maintain a count of packet forwarding lookup misses that are required to be looked up by CPU 308 in software LPM table 312 and software IPFDB 314. As described above, software LPM table 312 and software IPFDB 314 may include entries that have been learned but that have not been populated to hardware. When a miss occurs using packet forwarding hardware 300 on one of the modules 102A or 106A, the packet may be forwarded to management module 304 for forwarding. Management module 304 may perform a lookup in software LPM table 312 or software IPFDB 314 and forward the packet. According to yet another possible embodiment, IPFDB update controller (not shown) may communicate with a packet miss count table (not shown) in order to track the number of packets for which packet forwarding hardware lookups resulted in a miss. By sampling packets and only adding hosts to IPFDB 314 when certain conditions are satisfied, IPFDB update controller (not shown) may avoid unnecessarily filling IPFDB 314 with host entries. Further details of this aspect are described in U.S. patent application Ser. No. 11/317,665, filed on Dec. 23, 2005 and continuing U.S. Patent Application entitled, "Method and System for Automatic Expansion and Contraction of IP Host Forwarding Database" having attorney docket number 2717P146.

In addition to the "chassis"-based embodiment described above, the subject matter described herein may be applied to "stacking"-based embodiments as well. As used herein, a "stack" may include a plurality of individual switches (each fully enclosed in sheet metal) that may be connected together via cabling to form one logical switch. Each switch in the stack may be referred to as a "node", where each node in the stack may behave like I/O modules 102A-106A in the chassis embodiment shown in FIG. 3. Similarly, software running on one of the switches may perform functions such as those performed by management module 304 and the cabling interconnecting the switches may perform similar functions to that of switch fabric 306.

Figure 4:
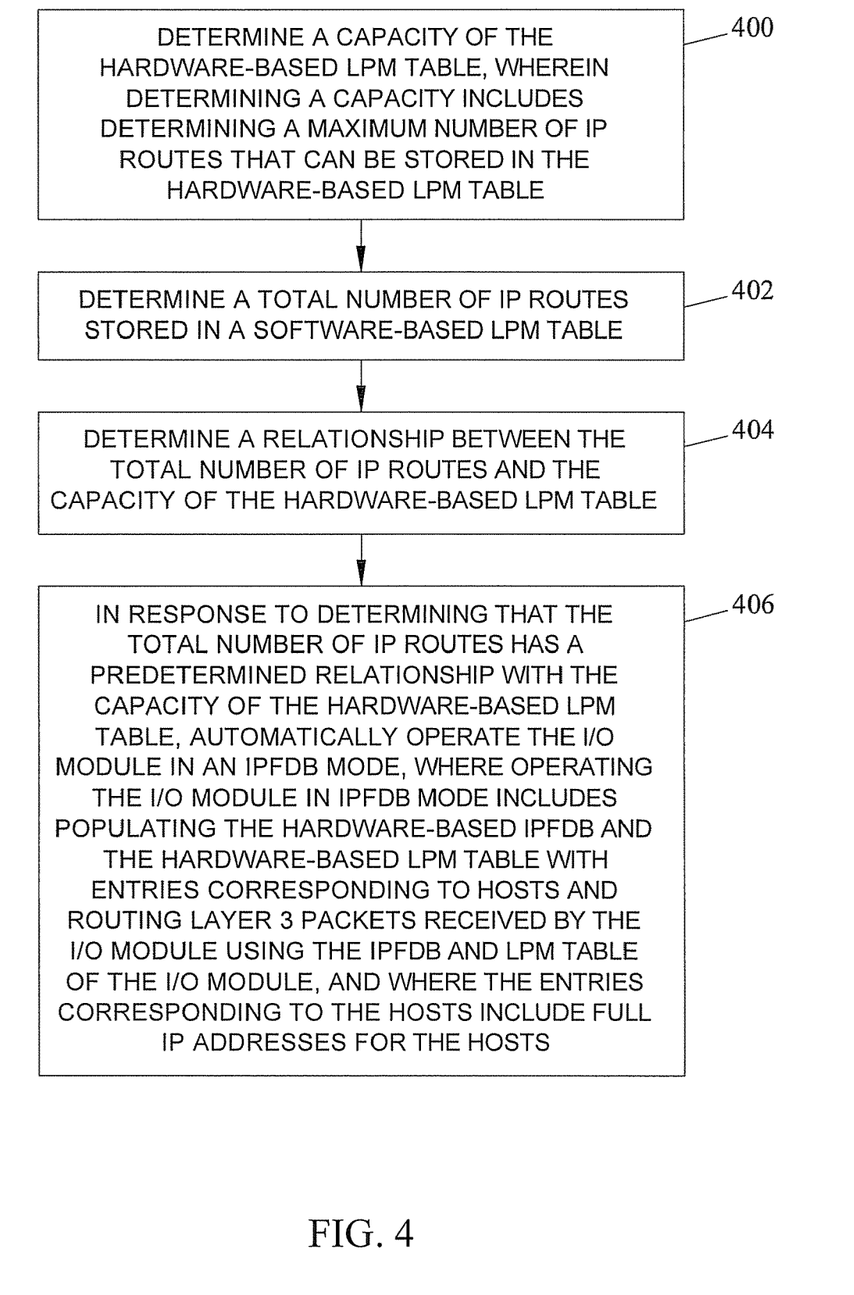
FIG. 4 is a flow chart illustrating exemplary steps for routing packets at a multi-mode layer 3 packet forwarding device according to an embodiment of the subject matter described herein.

FIG. 4 is a flow chart illustrating exemplary steps for automatically selecting between IP switching modes on a per-module basis in a packet forwarding device according to an embodiment of the subject matter described herein. Referring to FIG. 4, in step 400, a capacity of the hardware-based LPM table is determined, where determining the capacity includes determining a maximum number of IP routes that can be stored in the hardware-based LPM table. For example, the capacity of hardware LPM table 200 may be determined to support a maximum of 512 routes. Similarly, the capacity of hardware LPM table 204 may be determined to support a maximum of 250,000 routes.

In step 402, the number of IP routes stored in a software-based LPM table may be determined. For example, software-based LPM table 312 may store 25,000 routes. It may be appreciated that, in contrast to the determination made in step 400, the number of routes stored in software LPM table 312 may not be equal to the capacity of the software table (for which there practically is no limit), but instead is equal to the number of routes processed by packet forwarding device 100. For example, routes may be added to software table 312 through processing routing protocol updates or added using configuration commands. As a result, the number of routes stored in software table 312 may vary over time.

In step 404, a relationship between the total number of IP routes stored in the software-based LPM table and the capacity of the hardware-based LPM table may be determined. The relationship may include a threshold percentage of the capacity of the hardware LPM table for a particular I/O module. For example, 512 routes may be 100% of the capacity of LPM table 200 but may be just 0.2% of the capacity of LPM table 204. Alternatively, the relationship may include a threshold number of routes, which may or may not correspond to a particular percentage of capacity utilization. The relationship may include comparing the number of routes against the number of routes supported by hardware LPM table. For example, 25,000 routes may be larger than the 512 routes supported by LPM table 200, but may be smaller than the 250,000 routes supported by LPM table 204.

In step 406, in response to determining that the total number of IP routes has a predetermined relationship with the capacity of the hardware-based LPM table, an I/O module may be automatically operated in IPFDB mode, where operating the I/O module in IPFDB mode includes populating the hardware-based IPFDB and the hardware-based LPM table with entries corresponding to hosts and routing layer 3 packets received by the I/O module using the IPFDB and LPM table of the I/O module, and where the entries corresponding to the hosts include full IP addresses for the hosts. For example, it may be determined whether the number of routes can be stored entirely within the hardware-based LPM table of a given I/O module. In other words, the relationship may be expressed as a threshold utilization percentage of the capacity of hardware LPM table. In other embodiments, an I/O module may be switched between LPM and IPFDB modes before the number of routes exceeds a threshold corresponding to 100% of the hardware LPM table. For example, as the software routing table becomes filled with additional routes, it may be desirable to switch low-capacity I/O module 102A to IPFDB mode before 512 routes are reached (e.g., 500 routes). This may be due to decreased performance when LPM table 200 reaches 90% capacity, for example. Alternatively, it may be desirable to switch low-capacity I/O module 102A to IPFDB mode at some point after 512 routes are reached (e.g., 520 routes). For example, if LPM table 200 consistently stores around 510 to 515 routes based on network conditions, it may be desirable to avoid repeatedly flushing LPM table 200 and replacing it with host entries unless LPM table 200 is clearly overwhelmed (e.g., 5,000 routes).

Additionally, it is appreciated that in addition to the methods described above for determining the maximum number of routes that can be stored in hardware tables whose capacities are a known or fixed quantity, other types of hardware tables may exist whose capacity is data-dependent, aka "algorithmic". The subject matter described herein may also be applied to algorithmic hardware LPM tables without departing from the scope of the subject matter described herein. In one possible embodiment, a notification mechanism may be used to indicate that a particular route could not be added because it does not fit in the hardware LPM table. This notification can be used in the decision process to transition between LPM and IPFDB modes. For example, the transition between LPM and IPFDB modes could be performed at the first notification of "full", or some number of routes beyond that.

As mentioned above, one advantage to the automatic mode selection approach described herein is that it allows for more HW forwarding in low-capacity I/O modules by using the hardware LPM table as a cache for active individual hosts. Rather than storing a meaningless fraction of the entire routing table in the LPM table, low-capacity I/O modules may instead store active hosts in both the LPM table and the IPFDB, thereby providing faster HW forwarding for as many hosts as possible. Additionally, by allowing the packet forwarding device to automatically select the optimum packet forwarding approach on a per-module basis, all I/O modules may operate efficiently without burdening the user with configuring the operating mode for each I/O module.

Figure 5A:
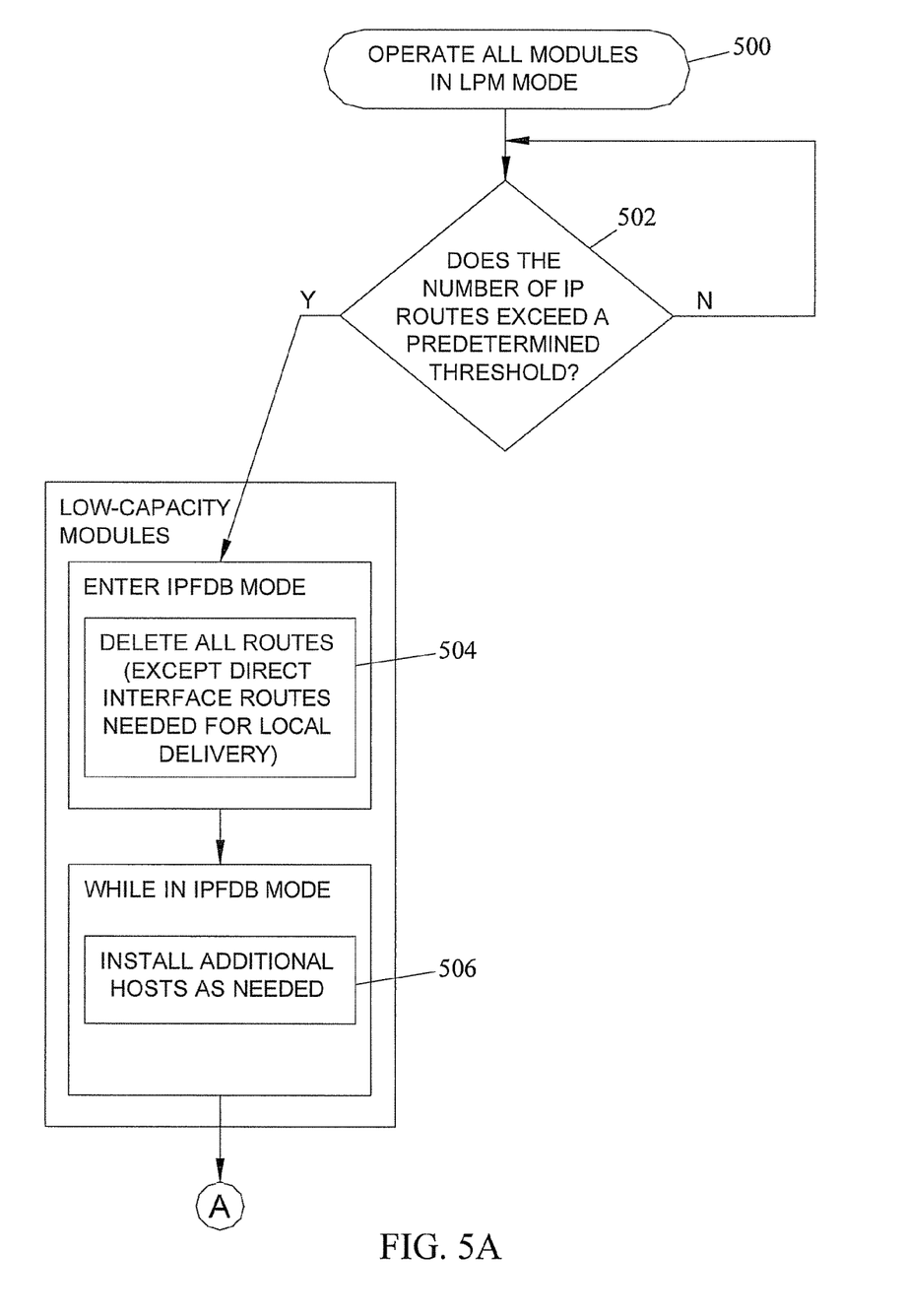
FIG. 5 is a more detailed flow chart illustrating exemplary steps for routing packets at a multi-mode layer 3 packet forwarding device according to an embodiment of the subject matter described herein.
Figure 5B:
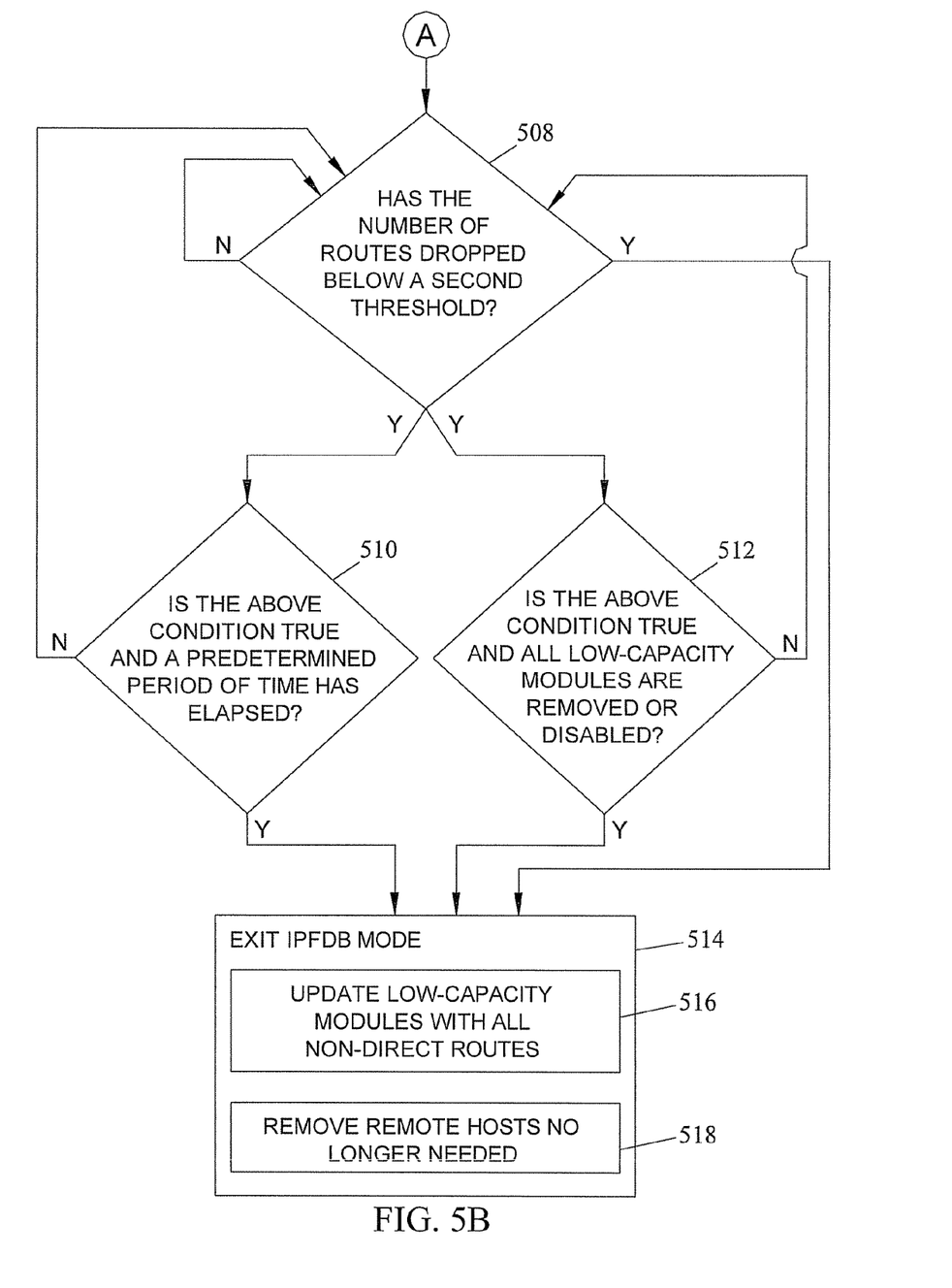

FIG. 5 is a more detailed flow chart illustrating exemplary steps for automatically selecting between IP switching modes on a per-module basis in a packet forwarding device according to an embodiment of the subject matter described herein. Referring to FIG. 5, at step 500 all I/O modules may initially operate in LPM mode. For example, hardware LPM tables 200 and 204 located on I/O modules 102A and 106A, respectively, may be populated with entries corresponding to variable length Internet protocol (IP) addresses and next hop addresses. Hardware IPFDBs 202 and 206 located on I/O modules 102A and 106A, respectively, may be populated with entries corresponding to hosts including full-length IP addresses (e.g., 32-bit IPv4 or 128-bit IPv6). Lastly, operating all I/O modules in LPM mode may include routing layer 3 packets received by I/O modules 102A and 106A using hardware LPM tables 200 and 204 and hardware IPFDBs 202 and 206.

In step 502, it is determined whether the number of IP routes exceeds a predetermined threshold. For example, for low-capacity module 102A, it may be determined whether the number of IP routes stored in software LPM table 312 exceeds 512 routes. It is appreciated that this determination may be made on a per-module basis in order to take into account potential differences in the capacities of the hardware-based LPM tables located on each I/O module. Thus, for high-capacity module 106A, it may be determined whether the number of IP routes stored in software LPM table 312 exceeds 250,000 routes.

If it is determined in step 502 that the number of IP routes does not exceed the predetermined threshold, control may return to step 502 where I/O modules may continue to operate in LPM mode and it may again be determined whether the number of IP routes does not exceed the predetermined threshold.

However, if it is determined in step 502 that the number of IP routes exceeds the predetermined threshold, control may proceed to step 504 where low-capacity I/O modules may be transitioned to operating in IPFDB mode. It may be appreciated that the use of low-capacity and high-capacity modules is merely intended to be illustrative and not limiting because while low-capacity modules may transition to IPFDB mode first, high-capacity modules may also transition to IPFDB mode if the routing table increases enough. Because low-capacity I/O modules previously operated in LPM mode (i.e., step 500), the process of transitioning to operating in IPFDB mode may initially include deleting routes stored in the hardware LPM table, except for direct interface routes needed for local delivery. Any local hosts and remote hosts may remain stored in the hardware IPFDB for the I/O module in IPFDB mode. It is appreciated that none, some, or all subnet routes may be deleted when transitioning from LPM mode to IPFDB mode. Deleting some but not all subnet routes would give a larger host cache space, but leave some subnet routes in the LPM table for LPM forwarding. The exact routes to keep or delete may be determined, for example, by a hardware "hit-bit" that indicates whether a route was used for lookup when forwarding a packet. Routes not "hit" over some period of time could be deleted to make more space for hosts in the LPM table.

While operating in IPFDB mode, I/O modules may install additional hosts as needed in step 506. For example, hosts may be added based on sampled slow-path-forwarded packets. Referring again to FIG. 3, slowpath processing may include receiving a packet at I/O module 102A, determining that the destination address is not located in IPFDB 202 or LPM table 200, and forwarding the packet to management module 304 via switch fabric 306. Management module 304 may add a host entry corresponding to the packet to software IPFDB 314 after processing. Management module 304 may then add the host entry information to hardware IPFDBs 202 and/or 206.

In step 508, it is determined, for I/O modules operating in IPFDB mode, whether to exit IPFDB mode. For example, it may be determined whether the number of routes has dropped below a second threshold. It may be appreciated that, in one embodiment, the second threshold may be less than the first threshold in order to avoid thrashing that may result from repeatedly bouncing back and forth between LPM mode and IPFDB mode, and consequently repeatedly deleting and re-populating hardware-based tables 200-206. For example, continuing the example described above where IPFDB mode is entered when the number of routes exceeds 512 routes (i.e., the first threshold), IPFDB mode may be exited only when the number of routes drops below 400 routes (i.e., the second threshold). However, it may be appreciated that in other embodiments, the first and second thresholds may be the same without departing from the scope of the subject matter described herein.

If it is determined in step 508 that the number of routes has not dropped below the second threshold, then control may return to step 508 where it may be determined again whether the number of routes has dropped below the second threshold. Alternatively, if the number of routes has dropped below the second threshold, one of several options may exist for exiting IPFDB mode.

A first option may include immediately exiting IPFDB mode if the condition in step 508 is satisfied. In other words, whether the number of routes has dropped below the second threshold may be the only condition for exiting IPFDB mode. Other options may include additional conditions before exiting IPFDB mode.

As shown in FIG. 5, a second option may include determining, in step 510, whether a predetermined time period has elapsed in addition to the number of routes being below the second threshold. For example, IPFDB mode may only be exiting after the number of routes is below 400 routes (i.e., the second threshold) for 30 seconds. It is appreciated that the time period may be pre-configured or dynamic, and may be customized on a per-module basis. Thus, a 30 second time period may be set for each I/O module, low-capacity modules may have a time period of 15 second and high-capacity I/O modules may have a time period of 45 seconds, or the time period may dynamically be adjusted based on network conditions or other factors.

A third option may include determining, in step 512, whether the number of routes is below the second threshold (i.e., step 508) and all low-capacity modules are removed or disabled. For example, IPFDB mode may be exited after the number of routes drops below 400 routes (the second threshold) and low-capacity modules 102A-102C are removed or disabled either physically or by administrator configuration. If the heuristic in step 512 is used, and a low-capacity I/O module is subsequently inserted or enabled, the low-capacity I/O module may be updated with all IP routes and hosts (i.e., its hardware LPM table and IPFDB populated) and may be initially operated in LPM mode. It is appreciated that the subject matter described herein may be applied in a single, machine-wide mode of operation or where each I/O module is considered separately and placed in its own mode of operation based on the optimal operation for the module.

Exiting IPFDB mode 514 may include one or more steps. In one embodiment, if the heuristic described in steps 508 or 510 is used, exiting IPFDB mode 514 may include, in step 516, updating all low-capacity I/O modules with non-direct routes and, in step 518, removing remote hosts that are no longer needed. For example, as host entries in hardware LPM table 200 are replaced with routes during the transition back to LPM mode, some routes may obviate the need to store some remote host entries in hardware IPFDB 202, so they may also be removed.

It will be understood that various details of the invention may be changed without departing from the scope of the invention. Furthermore, the foregoing description is for the purpose of illustration only, and not for the purpose of limitation.

What is claimed is:

1. A method for automatically selecting a forwarding approach on a per-module basis, the method comprising:
   operating an I/O module in a longest prefix matching (LPM) mode, wherein operating the I/O module in the LPM mode includes populating an Internet protocol forwarding database (IPFDB) with entries corresponding to active hosts, populating an LPM table with entries from an IP routing table with routes learned from IP routing protocols, and routing layer 3 packets received by the I/O module using the IPFDB and LPM table of the I/O module;
   determining a capacity of the LPM table;
   determining a total number of IP routes in the IP routing table;
   determining a relationship between the total number of IP routes in the IP routing table and the capacity of the LPM table; and
   in response to determining that the total number of IP routes in the IP routing table has a predetermined relationship with the capacity of the LPM table, automatically switching the I/O module from the LPM mode to an IPFDB mode, where the IPFDB and the LPM table are populated with entries corresponding to active hosts and routing layer 3 packets received by the I/O module using the IPFDB and the LPM table of the I/O module.

2. The method of claim 1 wherein the capacity of the LPM table includes a fixed, known quantity.

3. The method of claim 2 wherein determining the capacity of the LPM table includes determining one of a measure of the address space and a maximum number of routes supported by the LPM table.

4. The method of claim 2 wherein determining a relationship between the total number of IP routes and the capacity of the LPM table includes determining whether the number of IP routes is one of: less than a first threshold, exceeds the first threshold, or equal to the first threshold.

5. The method of claim 4 wherein the first threshold includes one of: a predetermined number of routes fewer than the capacity of the LPM table, a predetermined number of routes greater than the capacity of the LPM table, and equal to the capacity of the LPM table.

6. The method of claim 4 wherein the first threshold includes the number of IP routes that can be stored in the LPM table.

7. The method of claim 1 wherein the capacity of the LPM table includes an algorithm-determined quantity that depends on data stored in the LPM table.

8. The method of claim 7 comprising, in response to determining that the the total number of IP routes has a predetermined relationship with the capacity of the LPM table, generating a notification and, in response to the notification, automatically switching the I/O module from the LPM mode to the IPFDB mode.

9. The method of claim 7 wherein determining a relationship between the total number of IP routes and the capacity of the LPM table includes determining whether the number of IP routes is one of: less than a first threshold, exceeds the first threshold, or equal to the first threshold.

10. The method of claim 9 wherein the first threshold includes one of: a predetermined number of routes fewer than the capacity of the LPM table, a predetermined number of routes greater than the capacity of the LPM table, and equal to the capacity of the LPM table.

11. The method of claim 9 wherein the first threshold includes the number of IP routes that can be stored in the LPM table.

12. The method of claim 1 comprising:
    determining whether the number of IP routes in the IP routing table is less than a second threshold; and
    in response to determining that the number of IP routes in the IP routing table is less than the second threshold, switching from the IPFDB mode to the LPM mode.

13. The method of claim 12 further comprising:
    determining whether the number of IP routes in the IP routing table is less than the second threshold for a predetermined period of time; and
    in response to determining that the number of IP routes in the IP routing table is less than the second threshold for the predetermined period of time, switching from the IPFDB mode to the LPM mode.

14. The method of claim 1 wherein automatically switching from the LPM mode to the IPFDB mode includes deleting routes from the LPM table.

15. A packet forwarding device, the device comprising:
    at least one input/output (I/O) module implemented by a processor and a memory, the I/O module comprising:
      a longest prefix matching (LPM) table;
      an Internet protocol forwarding database (IPFDB);
      wherein the I/O module operates in an LPM mode, wherein operating the I/O module in the LPM mode includes populating the IPFDB with entries corresponding to active hosts, populating the LPM table with entries from an IP routing table learned from IP routing protocols, and routing layer 3 packets received by the I/O module using the IPFDB and the LPM table of the I/O module;
    an automatic mode-selection module for:
      determining a capacity of the LPM table;
      determining a total number of IP routes in the IP routing table;
      determining a relationship between the total number of IP routes in the IP routing table and the capacity of the LPM table; and
      in response to determining that the total number of IP routes in the IP routing table has a predetermined relationship with the capacity of the LPM table, automatically switching the I/O module from the LPM mode to an IPFDB mode, where the IPFDB and the LPM table are populated with entries corresponding to active hosts and layer 3 packets received by the I/O module are routed using the IPFDB and LPM table of the I/O module.

16. The packet forwarding device of claim 15 wherein the capacity of the LPM table includes a fixed, known quantity.

17. The packet forwarding device of claim 16 wherein the automatic mode-selection module is configured to determine one of a measure of the address space and a maximum number of routes supported by the LPM table.

18. The packet forwarding device of claim 16 wherein the automatic mode-selection module is configured to determine whether the number of IP routes is one of: less than a first threshold, exceeds the first threshold, or equal to the first threshold.

19. The packet forwarding device of claim 18 wherein the first threshold includes one of: a predetermined number of routes fewer than the capacity of the LPM table, a predetermined number of routes greater than the capacity of the LPM table, and equal to the capacity of the LPM table.

20. The packet forwarding device of claim 18 wherein the first threshold includes the number of IP routes that can be stored in the LPM table.

21. The packet forwarding device of claim 15 wherein the capacity of the LPM table includes an algorithm-determined quantity that depends on data stored in the LPM table.

22. The packet forwarding device of claim 21 wherein the automatic mode-selection module is configured to generate, in response to determining that the total number of IP routes has a predetermined relationship with the capacity of the LPM table, a notification and, in response to the notification, automatically switch the I/O module from the LPM mode to the IPFDB mode.

23. The packet forwarding device of claim 21 wherein the automatic mode-selection module is configured to determine whether the number of IP routes is one of: less than a first threshold, exceeds the first threshold, or equal to the first threshold.

24. The packet forwarding device of claim 23 wherein the first threshold includes one of: a predetermined number of routes fewer than the capacity of the LPM table, a predetermined number of routes greater than the capacity of the LPM table, and equal to the capacity of the LPM table.

25. The packet forwarding device of claim 23 wherein the first threshold includes the number of IP routes that can be stored in the LPM table.

26. The packet forwarding device of claim 15 wherein the automatic mode-selection module determines whether the number of IP routes in the IP routing table is less than a second threshold and, in response to determining that the number of IP routes in the IP routing table is less than the second threshold, switches from the IPFDB mode to the LPM mode.

27. The packet forwarding device of claim 15 wherein the automatic mode-selection module determines whether the number of IP routes in the IP routing table is less than the second threshold for a predetermined period of time and, in response to determining that the number of IP routes in the IP routing table is less than the second threshold for the predetermined period of time, switching from the IPFDB mode to the LPM mode.

28. The packet forwarding device of claim 16 wherein the automatic mode-selection module deletes IP routes from the LPM table when operating the I/O module in the IPFDB mode.

29. A computer program product comprising computer-executable instructions embodied in a non-transitory computer-readable medium for performing steps comprising:
operating an I/O module in a longest prefix matching (LPM) mode, wherein operating the I/O module in the LPM mode includes populating an Internet protocol forwarding database (IPFDB) with entries corresponding to hosts, populating an LPM table with entries from an IP routing table with routes learned from IP routing protocols, and routing layer 3 packets received by the I/O module using the IPFDB and LPM table of the I/O module;
determining a capacity of the LPM table;
determining a total number of IP routes in the IP routing table;
determining a relationship between the total number of IP routes in the IP routing table and the capacity of the LPM table; and
in response to determining that the total number of IP routes in the IP routing table has a predetermined relationship with the capacity of the LPM table, automatically switching the I/O module from the LPM mode to an IPFDB mode, where the IPFDB and the LPM table are populated with entries corresponding to active hosts and routing layer 3 packets received by the I/O module using the IPFDB and the LPM table of the I/O module.

* * * * *